J. H. D. PETERSEN.
PROCESS OF HANDLING COAL.
APPLICATION FILED AUG. 12, 1918.

1,430,183.

Patented Sept. 26, 1922.

Witness.
Edward T. Wray.

Inventor
John H. D. Petersen.
by Parker Carr
Attorneys.

Patented Sept. 26, 1922.

1,430,183

UNITED STATES PATENT OFFICE.

JOHN H. D. PETERSEN, OF CHICAGO, ILLINOIS, ASSIGNOR TO LINK-BELT COMPANY, OF CHICAGO, ILLINOIS, A CORPORATION OF ILLINOIS.

PROCESS OF HANDLING COAL.

Application filed August 12, 1918. Serial No. 249,467.

*To all whom it may concern:*

Be it known that I, JOHN H. D. PETERSEN, a citizen of the United States, residing at Chicago, in the county of Cook and State of Illinois, have invented a certain new and useful Improvement in Processes of Handling Coal, of which the following is a specification.

My invention relates to a method or process for handling and storing coal or the like particularly at the mine head or sizing plant or receiving and distribution point and for storing it or a portion of it adjacent thereto and returning it to the distribution point when desired.

I have illustrated the apparatus for carrying out the invention which is described in a copending apparatus application numbered 249,468 though, of course, it will be understood that the operation could be effected by any desired form of apparatus or any whole or any part by hand operated means. The illustration is diagrammatic.

Like parts are indicated by the same letter in all the figures.

Figure 1:
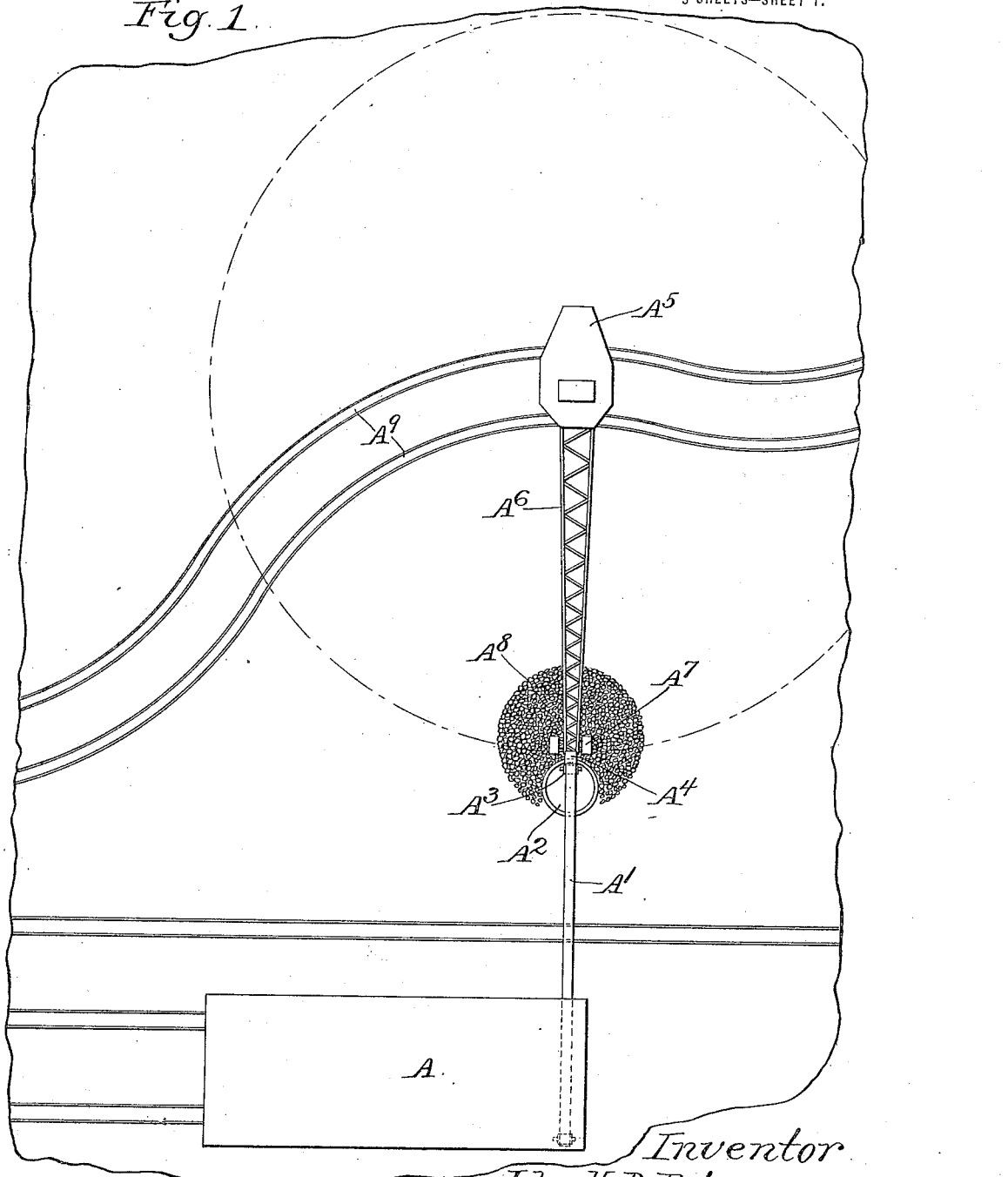
Figure 1 is a diagrammatic plan view of a plant illustrative of my invention.

A is a diagrammatic illustration of the distribution plant. $A^1$ is a conveyor preferably a belt conveyor leading therefrom. $A^2$ is a hollow tower over which the conveyor $A^1$ travels; $A^3$ a head pulley over which the conveyor runs; $A^4$ a chute of any desired length into which the conveyor discharges; $A^5$ is a movable crane having an arm $A^6$ from the outer end of which is operatively suspended the conveyor bucket $A^7$ adapted to operate on the pile of material $A^8$ and $A^9$ is the railroad track on which the crane $A^5$ may travel. All these parts are diagrammatically illustrated.

B is a short, approximately horizontally disposed conveyor near the bottom of the hollow tower $A^2$ preferably in a side recess associated therewith and underneath the opening at $B^1$ which is preferably provided with enclosing walls set near the angle of repose of the material to be dealt with. $B^2$ $B^2$ are the buckets of a conveyor which is adapted to operate vertically in the hollow tower and $B^3$ is the chute capable of being raised and lowered and adapted to discharge in its lower position onto the conveyor belt $A^1$. $B^4$ is a dotted line indicating the surface of the pile of coal over the opening $B^1$, and $B^5$ is a dotted line to indicate the position of the surface of the coal or other material when the conveyor B has been operated so as to draw off all the material lying above the opening $B^1$.

It will be obvious as we proceed with the discussion of the use and operation of these several parts that they may be greatly altered and changed and some omitted and substitutes be provided without departing from the spirit of my invention. In short, my drawings are only diagrammatic drawings, although working apparatus could be made following very closely the structure here illustrated.

The use and operation of my invention are as follows:—

I shall describe my method or process as it is worked out in connection with the apparatus here illustrated for as previously suggested it can be worked with very different apparatus or with hand operated apparatus.

At a coal distribution plant there is an unequal accumulation of material due to seasonal demands. Thus there may be in winter a very considerable accumulation of coal not suitable for winter trade but suitable for the summer trade and this coal must either be treated so as to be fit for the season for which it is produced or be stored as the supply is produced from time to time. If it is so stored, then it must be returned to the distribution plant when the season for its use has arrived. Thus a continuous operation is carried on, the entire product, in this case coal, being brought to the distribution plant, a portion of it being there treated and shipped out. That portion which is not seasonable being thence withdrawn and stored and that stored portion being subsequently returned to the distribution plant and there treated and thence shipped for use. A practical illustration of this method of procedure can be seen by the use of the apparatus as here illustrated.

Figure 2:
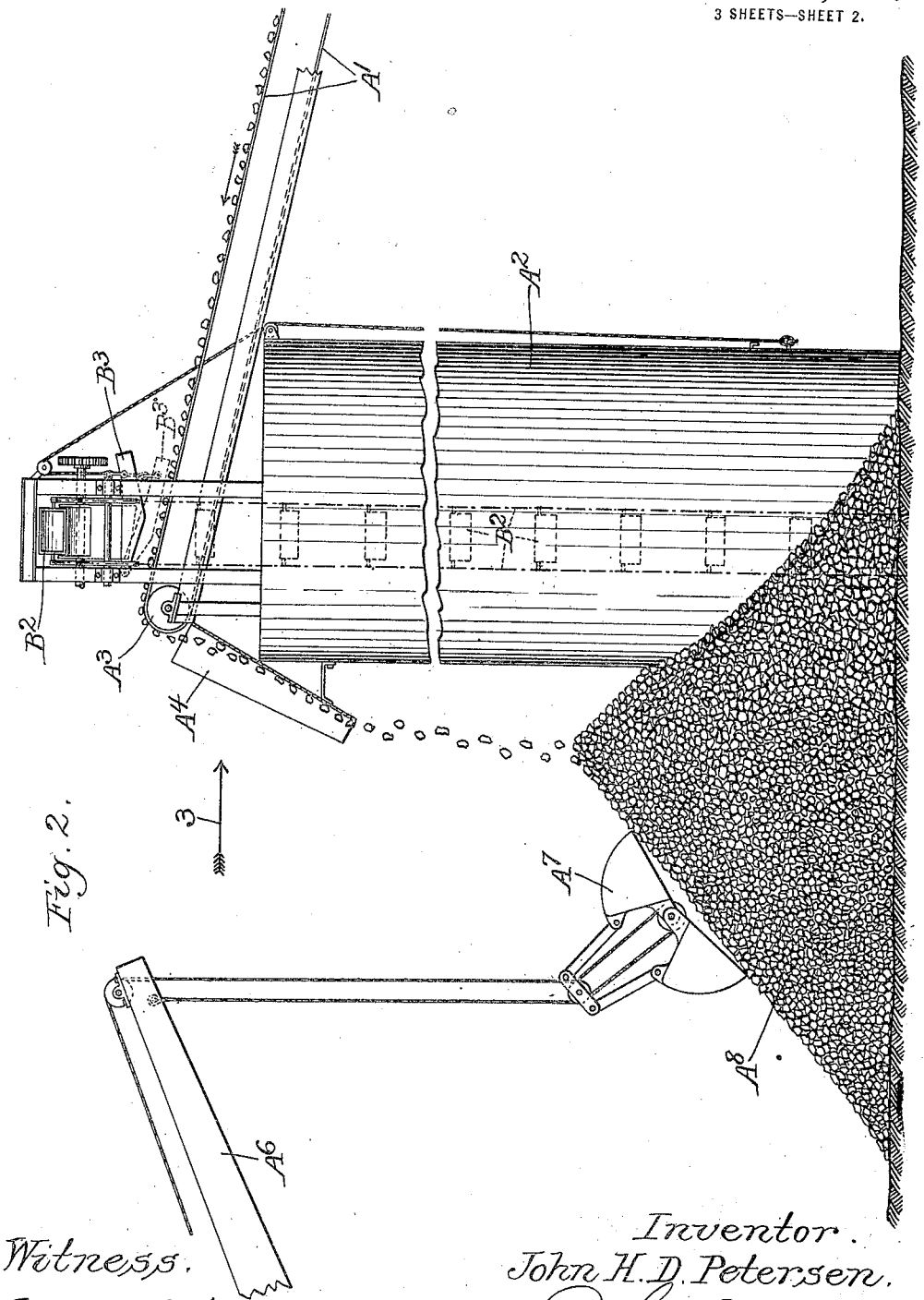
Figure 2 is a side elevation of a portion of the apparatus.
Figure 3:
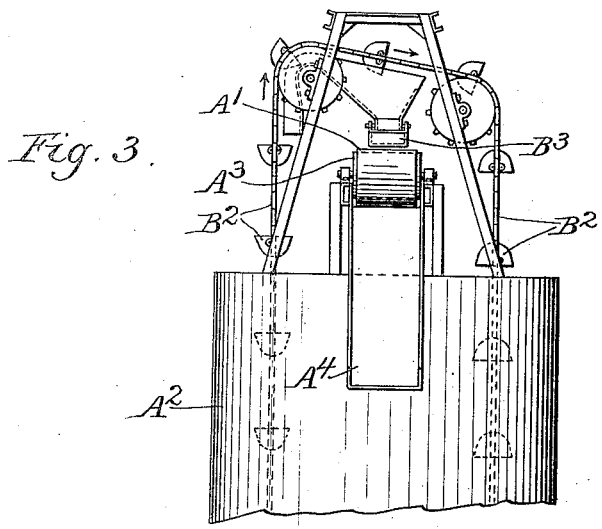
Figure 3 is a detailed side elevation looking in the direction of arrow 3 of Figure 2.

The summer coal accumulated in the winter may be carried by the belt conveyor $A^1$ over and discharged into the pile $A^8$. Here it is picked up by the crane and deposited in the area about the crane and along the tracks and this operation is continued from time to time, such unseasonable coal being steadily stored at a convenient point adjacent to the distribution point. When the time has arrived for the use of such coal, it should be returned to the distribution point for whatever treatment may there be required and then for distribution in the usual way. This is accomplished in the following manner. The conveyor belt B is set in operation, the vertical conveyor within the pockets B² is set into operation and the chute B³ is put into the position shown in dotted lines in Figure 2 and the travel of the belt A¹ is reversed. The action is to withdraw through the aperture B¹ from the coal pile at the foot of the hollow tower the coal which is then taken up by the buckets of the vertical conveyor, carried to and discharged along the reversed belt conveyor and by it carried back to the distribution house.

Figure 4:
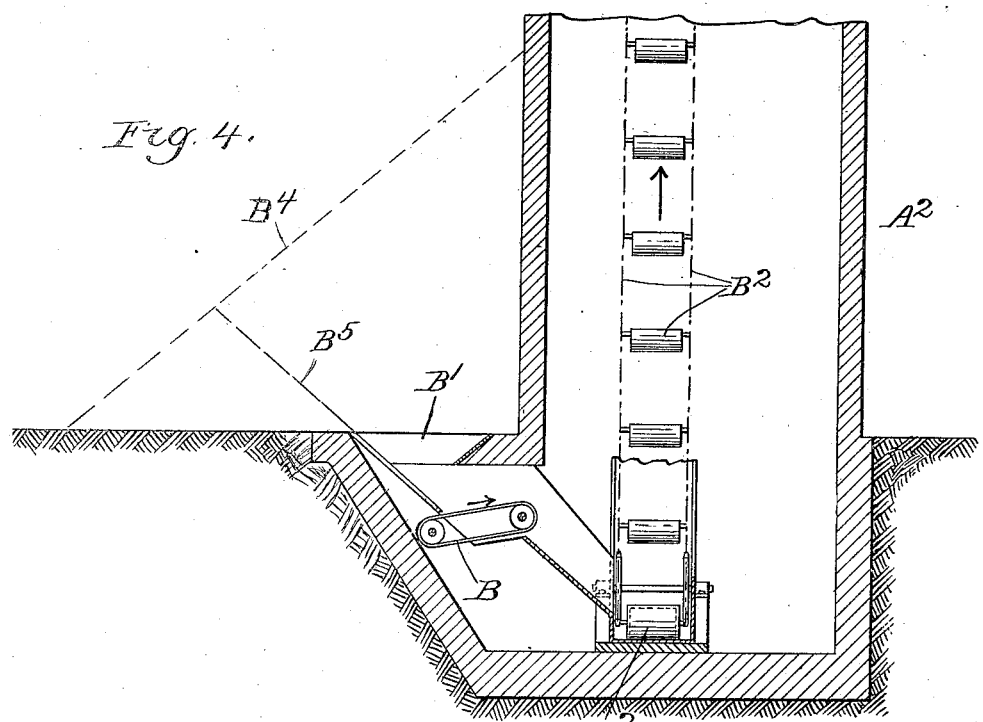
Figure 4 is a detailed cross-section of a portion of the apparatus.

Meantime, the crane is operated to pick the material from the pile about the tracks A⁹ and drop it over the aperture B¹. This operation is facilitated by the fact that the coal has been drawn away from the center of the pile A⁸ as indicated by the dotted line in Figure 4 so as to leave a large upwardly opening funnel whose walls are composed of coal. In the top of this funnel the crane can easily drop its load and the material passes down through the aperture B¹ onto the belt B.

In this way the coal is compelled to form its own unloading chute or funnel and to dispense with any hopper with inclined bottom walls. Of course this opening could be placed at a considerable distance from the hollow tower if desired so as to give a more uniform or symmetrical coal pile and funnel opening but what is here illustrated is sufficient for the purpose. The arrangement of the belt conveyor, vertical conveyor and associated parts is such that the material is first carried to the bottom of the tower and then by reversing the belt and operating the vertical conveyor, can be carried back over the same route to the distribution point.

In other words, the coal or material is carried by a cycle of movements from the distribution point out to the intermediate or temporary storing point to which it is permitted to fall by gravity. Then it is raised and carried back over the same path to a point where it originated.

I claim:—

1. The method of handling and storing mixed materials of various grades which consists in conveying the mixed materials to a distribution point, grading the material at that point, conveying one grade of material to the point of use, simultaneously conveying another grade of material toward a storage place, discharging it by gravity at an intermediate point, moving it thence to the storage place, returning it from the storage place to the intermediate point, conveying it thence to the distribution point and thence with other material of similar grade to the point of use.

2. The method of handling and storing mixed materials of various grades which consists in conveying the mixed materials to a distribution point, grading the material at that point, conveying one grade of material to the point of use, simultaneously conveying another grade of material toward a storage place, discharging it by gravity at an intermediate point, moving it thence to the storage place, returning it by the same route from the storage place to the intermediate point, conveying it thence to the distribution point and thence with other material of similar grade to the point of use.

3. The method of handling and storing mixed materials of various grades which consists in conveying the mixed materials to a distribution point, grading the material at the point, conveying one grade of material to the point of use, simultaneously conveying another grade of material toward a storage place, discharging it at an intermediate point, moving it thence to the storage place, returning it from the storage place to the intermediate point, conveying it thence to the distribution point and thence with other material of similar grade to the point of use.

4. The method of handling and storing materials which consists in conveying materials to a distribution point, conveying one portion of such materials to the point of use, simultaneously conveying another portion of such material toward the storage place, discharging it by gravity at an intermediate point, moving it thence to the storage place, returning it from the storage place to the intermediate point, and conveying it thence to the distribution point.

5. The method of transporting materials from their source of supply, under conditions of varying transportation facilities, which consists in conveying away a portion of the materials, for which transportation is available, and simultaneously conveying that portion of the materials for which transportation is not available toward a storage place, discharging it and returning it from the storage place to the point of distribution when transportation becomes available.

6. The method of transporting materials from their source of production under conditions of varying transportation facilities, which consists in conveying away a portion of the materials, for which transportation is available, and simultaneously conveying that portion of the materials for which transportation is not available toward a storage place, and subsequently returning it from the storage place to the point of transportation, when such transportation becomes available, by the same route by which it was removed thence for storage.

7. The method of transporting materials, from their source of supply which consists in shipping directly to the point of use such portion, if any, of the materials for which transportation is available, and separately and simultaneously conveying such of the materials, transportation for which is not available to a storage place, and returning it from said storage place to the source of production for shipping, when transportation becomes available.

8. The method of transporting materials, from the source of supply which consists in shipping directly away such portion, if any, of the materials for which transportation is available, and separately and simultaneously conveying such of the materials, transportation for which is not available to a storage place, and returning it from said storage place to the source of production for shipping, when transportation becomes necessary.

9. The method of handling and storing materials adjacent the source of supply, under conditions of varying transportation facilities, which consists in conveying materials from their source of production to a shipping point, conveying one portion of such materials directly away, simultaneously conveying another portion of such materials toward a place of storage, and returning such portion progressively from such place of storage to the shipping point, as means for transportation become available therefor.

10. The method of handling and storing materials adjacent their source of supply which consists in conveying such materials from their source of supply to a shipping point, transporting thence for use portions of said materials for which transportation is available, simultaneously conveying other portions of said materials for which transportation is not available toward a storage place, discharging it by gravity at an intermediate point, moving it thence to the storage place, returning it by the same route from the storage place to the intermediate point, as transportation therefor becomes available, and conveying it thence to the point of shipping, and transporting it thence to the point of use.

In testimony whereof I affix my signature in the presence of two witnesses this 9th day of August, 1918.

JOHN H. D. PETERSEN.

Witnesses:
L. D. MEYER,
M. L. INGRAHAM.